Figures 1, 2:
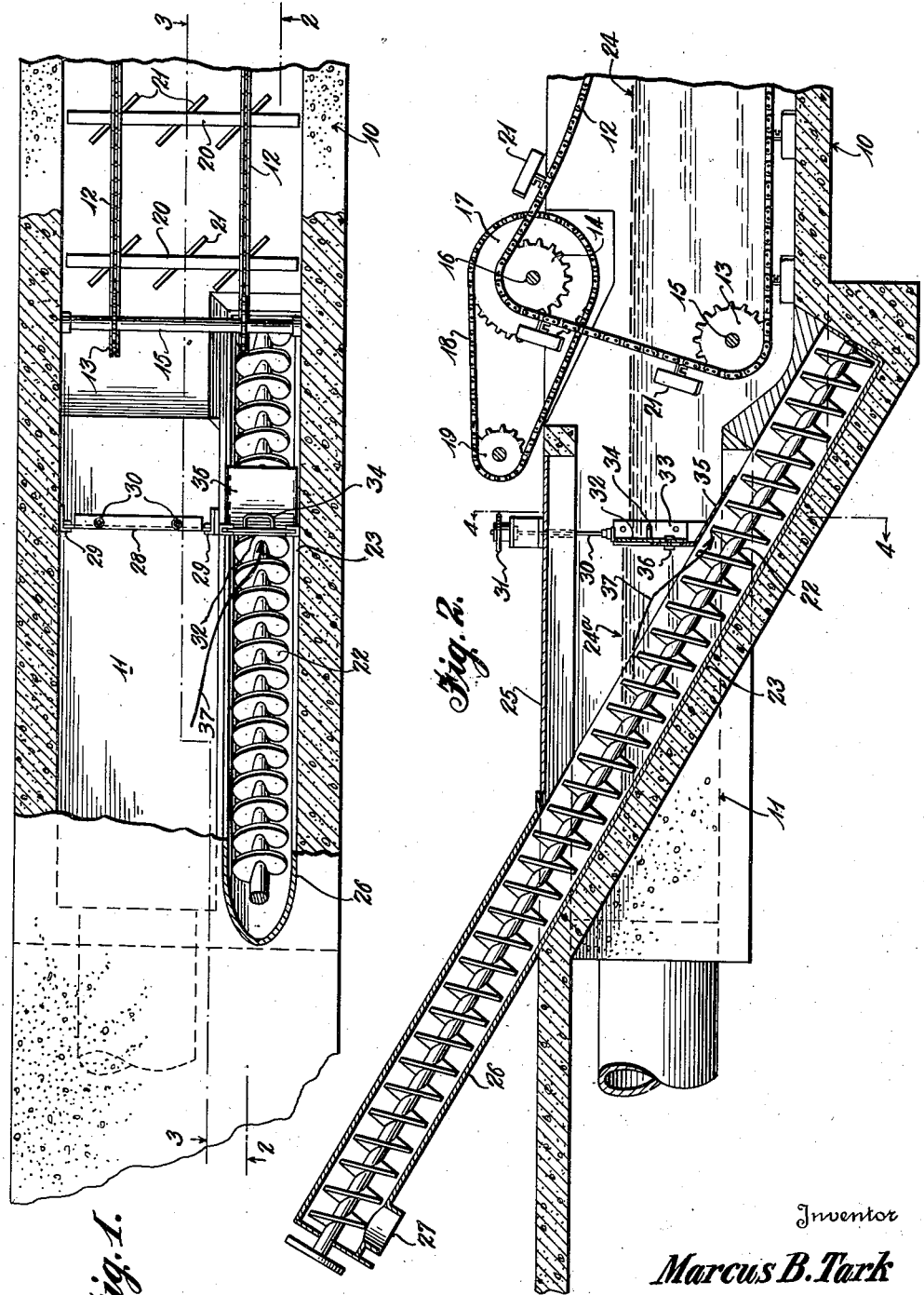

Dec. 23, 1941.  M. B. TARK  2,266,937
METHOD AND APPARATUS FOR TREATING SEWAGE AND INDUSTRIAL WASTE
Filed Aug. 23, 1940  4 Sheets-Sheet 1

Inventor
Marcus B. Tark
By L. Donald Ungers
Attorney

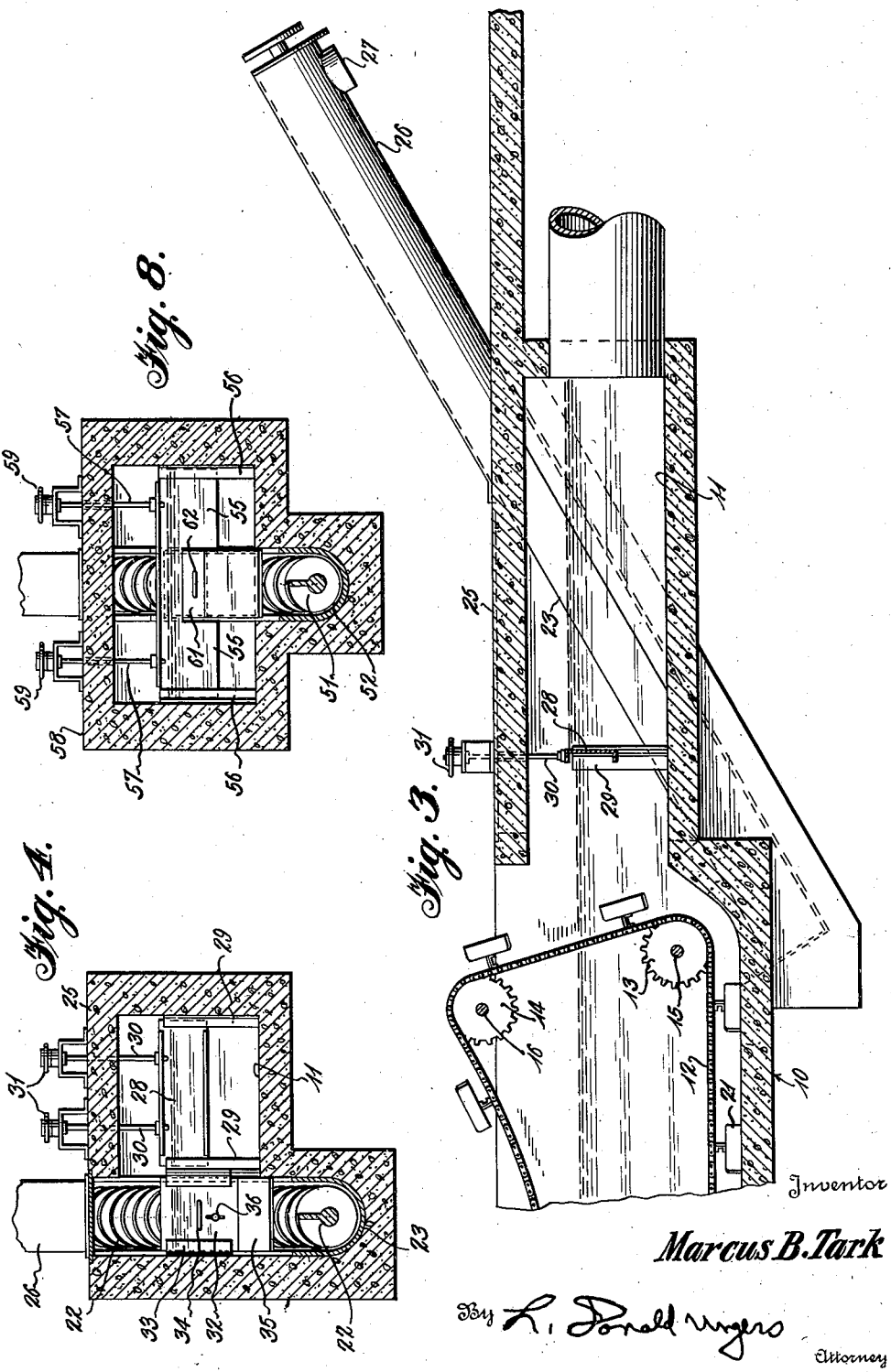

Dec. 23, 1941.                M. B. TARK                2,266,937
METHOD AND APPARATUS FOR TREATING SEWAGE AND INDUSTRIAL WASTE
             Filed Aug. 23, 1940            4 Sheets-Sheet 3
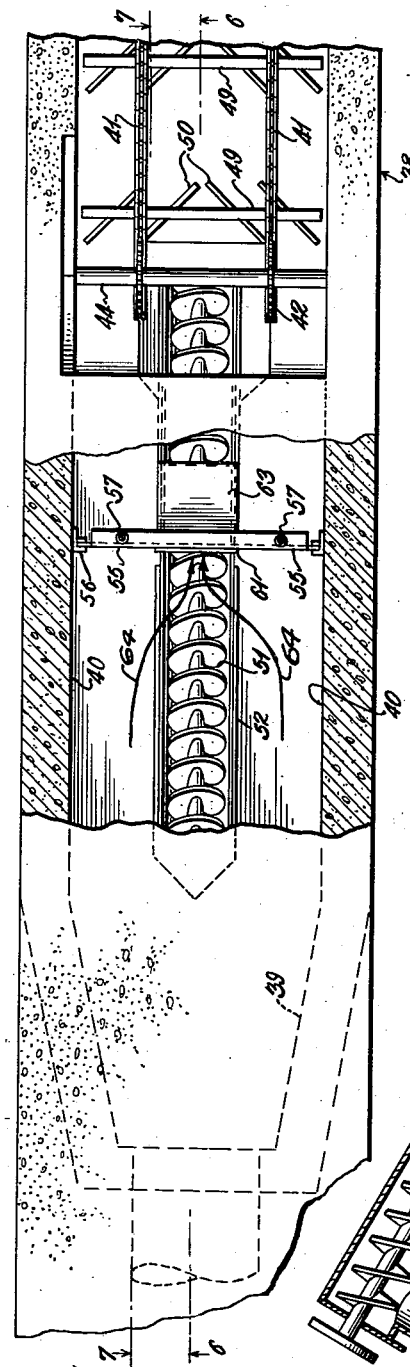
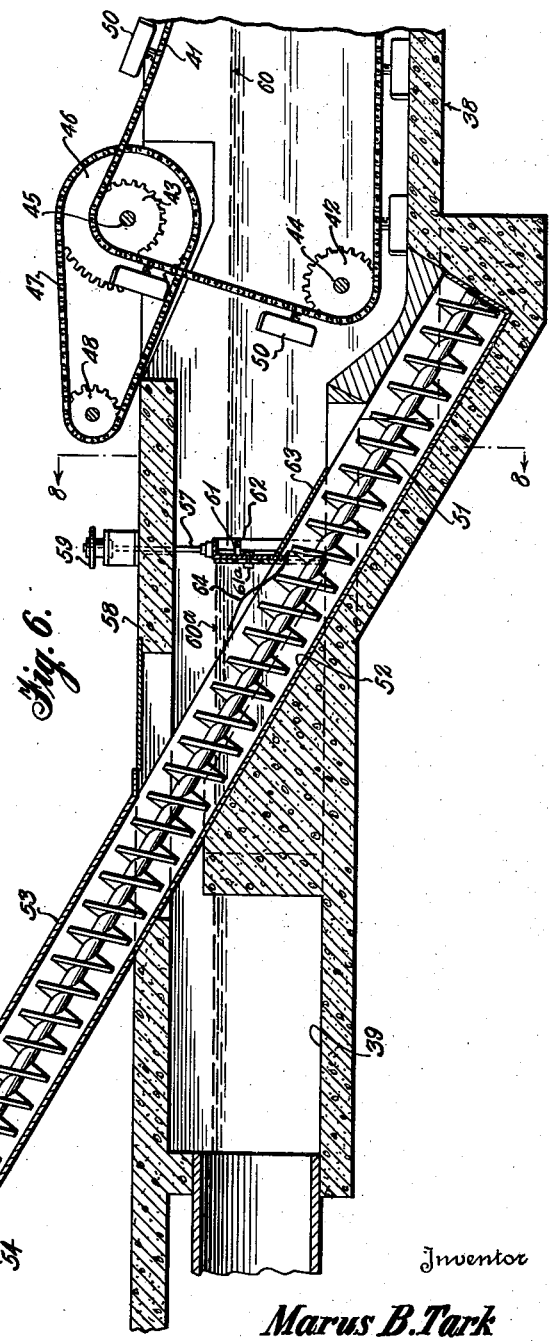
Inventor
Marus B. Tark

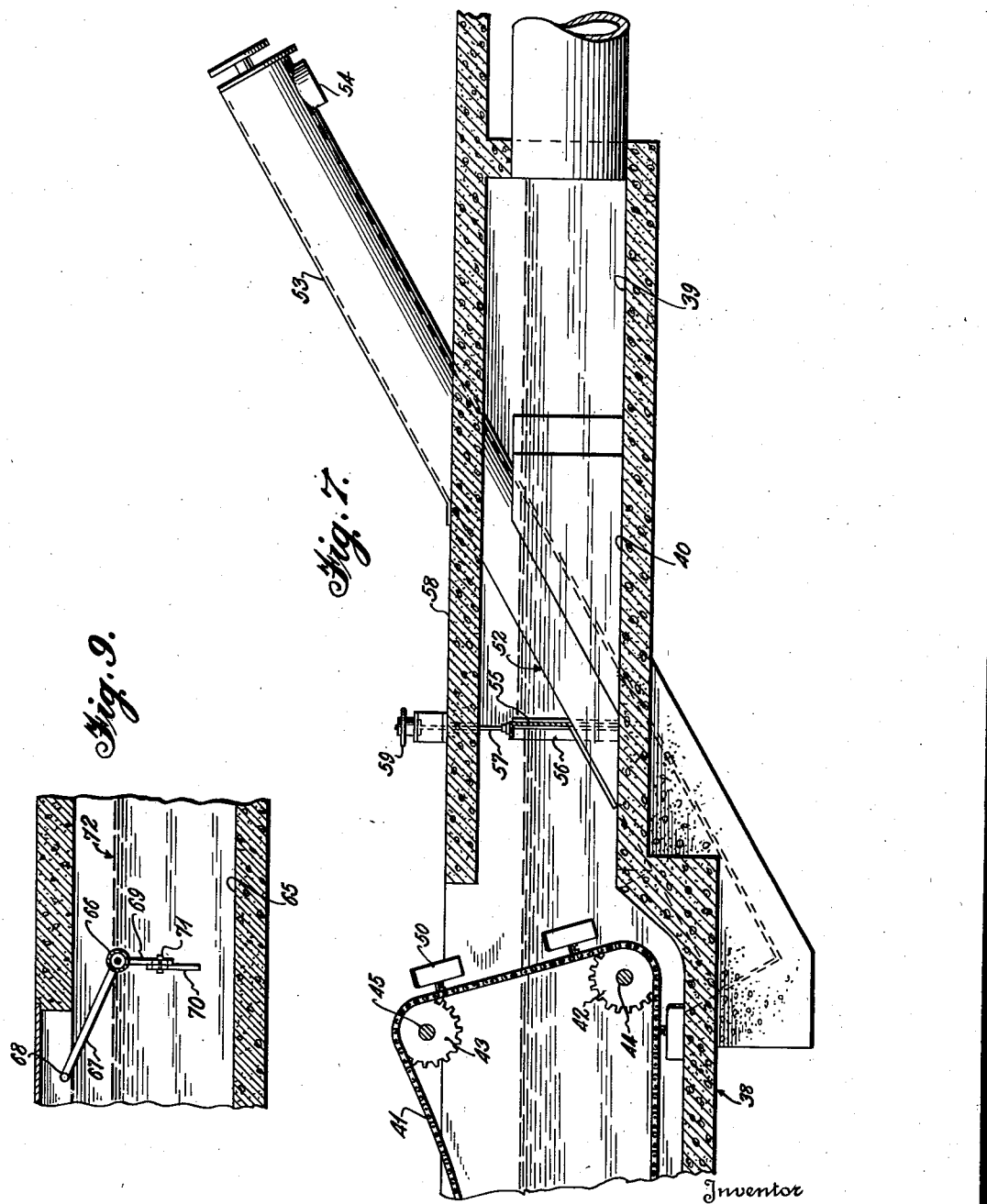

Patented Dec. 23, 1941

2,266,937

UNITED STATES PATENT OFFICE 2,266,937

METHOD AND APPARATUS FOR TREATING SEWAGE AND INDUSTRIAL WASTE

Marcus B. Tark, Philadelphia, Pa., assignor to Link-Belt Company, a corporation of Illinois Application August 23, 1940, Serial No. 353,923

10 Claims. (Cl. 210—3)

This invention relates to improvements in methods and apparatus for treating sewage and industrial waste and deals more particularly with the separation from domestic sewage and industrial waste of grit and other detritus which has been freed of organic suspended solids, such as putrescible material.

It is a present practice in the primary treatment of sewage, and the like, having an amount of grit which makes its removal desirable or necessary for the protection of pumps and other plant equipment, to pass the sewage through one or more grit chambers at a flow velocity which theoretically will permit the grit to settle and the putrescible organic material to remain in suspension. The settled grit is collected either continuously or intermittently and is elevated from the chamber while it is being washed and dewatered. The putrescible organic material is supposed to flow out of the chamber and be carried away so that it may undergo further treatment in other parts of the plant. Some of the putrescible organic material, however, either will be carried to the bottom of the chamber by the settling solids or will be heavy enough to settle with the grit. For the purpose of returning to its suspended state the organic material which reaches the bottom of the chamber with the grit, it is the present practice to agitate the grit as it is being moved along the bottom of the chamber toward its elevating, washing, and dewatering apparatus. This agitation of the grit will effect liberation of some of the organic material, but the heavier material will remain with the grit and the final washing of the grit, as it is elevated from the chamber, separates this heavy material so that it may float away with the sewage flowing through the grit chamber. My original Patent No. 1,864,778, issued June 28, 1932, and its reissue No. 20,320, dated April 6, 1937, disclose and claim apparatus for treating domestic sewage and industrial waste in the above noted manner.

It has been found in actual practice, however, that considerable difficulty is experienced in floating away the heavy organic material which is separated from the grit by the final washing operation, and it is the primary object of my present invention to provide a method of and apparatus for accomplishing this desired result without in any way interfering with the grit washing operation or the other normal functions of the grit chamber.

A further important object of the invention is to provide a method of and apparatus for effecting positive removal of the heavy organic material which is separated from the grit during its final washing operation without requiring the consumption of any force or power other than that which can be obtained from the sewage in its passage through the grit chamber.

More specifically stated, it is an object of my invention to forcibly float away the heavy putrescible organic material which is separated from the grit during its final washing operation by causing a part of the influent to flow with a sufficiently increased velocity directly over the washing apparatus and in a direction opposite the direction of travel of the grit through said apparatus.

Another object of the invention is to provide apparatus of the above noted type which will operate automatically to compensate for variations in the volume of sewage passing through the grit chamber.

Other objects and advantages of the invention will be apparent during the course of the following description.

In the accompanying drawings forming a part of this specification and in which like numerals are employed to designate like parts throughout the same, Figure 1 is a fragmentary top plan view, partly broken away, of a grit chamber with the method and apparatus embodying this invention applied thereto, Figure 2 is a vertical sectional view taken on line 2—2 of Fig. 1, Figure 3 is a vertical sectional view taken on line 3—3 of Fig. 1, Figure 4 is a transverse vertical sectional view taken on line 4—4 of Fig. 2, Figure 5 is a view similar to Fig. 1 but illustrates a modified type of grit chamber with the method and apparatus embodying this invention properly applied thereto, Figure 6 is a longitudinal vertical sectional view taken on line 6—6 of Fig. 5, Figure 7 is a longitudinal sectional view taken on line 7—7 of Fig. 5, Figure 8 is a transverse vertical sectional view taken on line 8—8 of Fig. 6, and Figure 9 is a detail vertical sectional view disclosing a form of automatic, self-adjusting influent baffle which may be employed in place of the manually adjustable influent baffles disclosed as a part of both modifications of the invention shown in the preceding figures.

In the drawings, wherein for the purpose of illustration are shown the preferred embodiments of this invention, and first particularly referring to Figs. 1 to 4, inclusive, the reference character 10 designates the grit chamber through which sewage undergoing primary treatment is adapted to flow at a velocity which will favor the settling of grit and other detritus while permitting the organic solids, such as putrescible material, to remain in the sewage in suspension. The raw sewage enters the grit chamber through the influent channel 11, which in this form of the invention is offset to one side of the longitudinal center line of the chamber. The effluent for the sewage is not disclosed, but it is to be understood that it is located at the opposite end of the grit chamber.

As the grit settles to the bottom or floor of the chamber 10, it is collected and moved therealong by a combined scraper-conveyor and agitator mechanism. This mechanism includes two chains 12 which run over suitable sprockets 13 and 14 carried by transverse shafts 15 and 16, respectively. It will be understood that similar shafts and sprockets are provided at the effluent end of the chamber for guiding the chains in any desired manner through the undisclosed portion of the chamber. The shaft 16 is illustrated in Fig. 2 as having mounted thereon a driven sprocket 17 over which is trained the transmission chain 18 that runs from the driver 19. The shaft of this driver sprocket 19 may be connected in any suitable manner to an appropriate source of power, such as an electric motor, not shown.

At suitable spaced intervals, the parallel conveyor chains 12 have connected thereto the crossbars 20 on which are mounted the scraper flights 21. These flights are all diagonally arranged or biased so that they will work the grit transversely of the chamber to one side thereof as it is collected and moved longitudinally of the chamber. In moving the grit along the bottom or floor of the chamber 10, the flights 21 agitate the grit for the purpose of liberating organic solids which have settled to the bottom of the chamber with the grit. This agitation of the grit will liberate and return to its suspended state a part of the organic material which has reached the floor of the chamber.

As the collected grit, admixed with a certain percentage of heavy organic solids reaches the influent end of the settling chamber, it is delivered into the feed end of a screw elevator 22 which is arranged within an open-topped trough 23 from its receiving end to a point well above the liquid level 24 in the grit chamber. This screw conveyor extends above the ground level, or top 25 of the apparatus through a closed casing portion 26 for discharge through an outlet opening 27 into any desired form of receiving apparatus. It will be noted by inspecting Figs. 2 and 3 that the screw conveyor 22 is arranged at an angle to or is inclined with respect to the horizontal.

As the admixture of grit and heavy organic material is carried up the inclined path of the screw conveyor 23, the grit is washed by the action of the submerged portion of the screw and this washing of the grit liberates or separates therefrom all but a very small portion of the heavy organic solids which have reached the screw with the grit. As the washed grit is carried above the water level 24a, the water drains therefrom. The dewatered grit is then carried up the remainder of the casing 26 and discharges through the outlet opening 27. The heavy organic solids which have been washed from the grit by the action of a lower portion of the screw are intended to be floated away with the influent and carried thereby back into the main portion of the grit chamber 10. As has been stated above, however, it has been found in actual practice that this heavy organic material will not be satisfactorily floated away by the influent because of the low velocity the sewage must have to provide the proper detention period in the grit chamber.

The present invention relates to a method of and means for accomplishing the removal of the heavy organic solids from the washing apparatus as they are separated from the grit. To accomplish this desired result, a vertically adjustable baffle 28, best shown in Figs. 1, 3, and 4, is positioned in the influent channel 11 and is guided for vertical movement by the guides 29. To accomplish adjustment of this baffle 28, screws 30 are connected to the upper edge portion of the baffle and extend above the top 25 of the apparatus. Adjusting wheels, having threaded hubs, are operatively connected with the upper ends of the screw shafts 30 so that rotation of the wheels in opposite directions will bring about raising and lowering of the baffle 28. This baffle, when in an operative position, will be sufficiently submerged in the raw sewage passing through the influent channel 11 to build up a fluid head in this channel, or to create a differential between the water level 24a in the influent channel and the water level 24 in the grit chamber proper.

In transverse alignment with this baffle 28 and positioned above the screw 22 is a second baffle plate 32, which is best disclosed in Figs. 1, 2, and 4. This second baffle plate is supported for vertical movement by the guides 33. A handle 34 is provided on this baffle 32 so that it may be vertically adjusted manually with respect to its guides 33. Arranged in overlapping relation with the lower portion of the baffle 32 and extending from the lower edge of this latter baffle longitudinally downwardly along the grit washing portion of the screw 22 is a plate 35. Fig. 2 discloses this plate as extending in a plane which is substantially parallel with the axis of the screw and is spaced from the peripheral edge of the screw flight a sufficient distance to permit flow of water between the lower face of the plate and the screw flight.

This plate 35 should be properly positioned with respect to the periphery of the screw flight and will be fixed in this position, as by attaching it in any desired manner to either the guides 33 or the trough 23. The baffle 32 should be properly adjusted to take care of the conditions of operation of the particular grit chamber with which it is associated and it then should remain in this adjusted position. As one means of retaining the baffle 32 in its desired adjusted position, fastening means 36 is disclosed. This fastening means attaches the baffle 32 to the fixed plate 35. Adjustment of the baffle 28 is made to take care of variations in the amount of sewage passing through the apparatus.

With the baffles 28 and 32 and the plate 35 in operative position, it will be appreciated that the baffle 28 will build up a fluid head in the influent channel 11 and a portion of the influent will be diverted from the channel 11 and will be compelled to pass beneath the lower edge of the baffle 32 and beneath the plate 35 in a downward direction along the screw elevator and washing device 22, as is indicated by the arrow line 37.

The velocity of this flow or current of sewage downwardly over the washing apparatus will be greater than the flow velocity through the grit chamber 10 and should be sufficient to forcibly float away the putrescible organic material which is washed from the grit by the screw 22. Therefore, the separated organic solids will be delivered to the sewage in the grit chamber 10 and will have another opportunity to remain in suspension in this sewage and flow from the chamber 10 through its effluent.

Figures 5 to 8, inclusive, disclose the adaptability of this invention to grit chambers of the type where the washing apparatus is centered with respect to the longitudinal center line of the chamber and the influent is split into two branch channels for passage around the washing apparatus.

In these figures, the grit chamber is designated by the reference character 38. The influent channel includes a main portion 39 which is split up into two branch channels 40.

The grit and organic solids which settle to the bottom or floor of the grit chamber 38 are collected and moved therealong toward the influent end of the chamber by the conveyor chains 41 which are trained over sprockets 42 and 43 which are carried by shafts 44 and 45, respectively. The shaft 45 is driven by the sprocket 46 over which is trained the transmission chain 47 that is driven by the driver 48. The shaft of this driver receives its power from any suitable source, such as an electric motor, not shown.

Crossbars 49 are attached to the conveyor chains 41 at suitable intervals, and these crossbars carry the grit collecting, agitating, and moving flights 50. Because of the central location of the grit washing and dewatering apparatus, these flights 50 are arranged to move the grit and organic solids, which have settled to the bottom of the chamber 38, both longitudinally of and transversely inwardly of the chamber so that they may be delivered to the washing and dewatering apparatus.

The washing and dewatering apparatus includes the screw elevator 51 which is located in an open topped trough 52 for a portion of its length and then passes through a closed casing 53 provided with a discharge opening 54 at its upper end.

In this form of the invention, a dual baffle 55, best shown in Figs. 5, 7, and 8, extends the full width of the two branch influent channels 40 and the central portion of the influent above the washing and dewatering apparatus. This baffle 55 is guided at its sides by the guides 56 and is connected at its upper edge portion to the adjusting screws 57 that extend outwardly through the top 58 of the apparatus for connection with the operating wheels 59. By rotating these wheels, the baffle 55 may be raised and lowered so that it will maintain a fluid head or higher liquid level 60a in the influent branches 50 than the liquid level 60 of the grit chamber 38.

A second baffle 61 is arranged in transverse alignment with the baffle 55 and is positioned above the washing and dewatering screw 51. This baffle 61 is vertically adjustable manually by means of the handle 62. Below this center baffle 61 is a fixed plate 63 which extends downwardly over the washing and dewatering screw 51 in the same manner as the plate 35 for the previously described embodiment of the invention. The baffle 61 is retained in its desired adjusted positions by means of the fastening device 61a, which also passes through the fixed plate 63, see Fig. 6.

The baffles 55 and 61 cooperating with the plate 63 will cause a portion of the sewage passing through the influent branches 40 to be diverted and directed downwardly over the washing screw 51 in the direction of the arrow line 64. This flow or current of water will operate in the same manner as described in connection with Figs. 1 to 4, inclusive, for forcibly floating away the heavy organic solids which have been washed from the grit by the action of the submerged portion of the screw 51. This heavy organic material will be returned to the grit chamber 38 and will be given another opportunity to flow with the grit-free sewage through the effluent of the chamber.

It will be appreciated that the amount of sewage which passes through the grit chamber of a normal sewage treating plant will vary considerably during different portions of each 24-hour period. With the apparatus disclosed in Figs. 1 to 8, inclusive, it is necessary for an attendant to take care of these variations by adjusting the hand wheels which operate the influent baffles. In Fig. 9 there is disclosed a type of influent baffle which will automatically adjust itself to take care of different liquid levels in the influent channel so that a constant head may be provided at all times to produce the desired concentrated flow or current of water along the top of the washing apparatus.

In this Fig. 9, the influent channel 65 has arranged therein a suitable float 66 which is supported by an arm, or arms, 67 pivoted at 68 to the top, or any suitable portion, of the channel. The float 66 has depending therefrom a two-part baffle which is made up of portions 69 and 70 that are relatively adjustably interconnected by the securing means 71. After these two baffle parts 69 and 70 are properly adjusted with respect to each other, they may be left in this desired condition. As the water lever 72 rises and falls in the influent channel 65, the float 66 will maintain the baffle 69—70 at the desired submerged position. It will be appreciated that this type of self-adjusting baffle may be provided in either one or both of the types of grit chamber devices disclosed in the preceding Figs. 1 to 8, inclusive.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. The method of treating sewage, industrial waste, or the like, comprising passing sewage containing grit and putrescible organic material through a settling zone at a flow velocity which will favor settling of the grit, collecting the settled grit and moving it in a counter-current direction with respect to the direction of flow of the sewage to a point in the settling zone adjacent the sewage influent, elevating the grit from the settling zone as it reaches said point and simultaneously agitating it to wash therefrom putrescible organic material which has followed the movement of the grit, and effecting passage of a portion of the sewage influent, at a velocity greater than the normal flow velocity of the sewage passing through the settling zone, over the grit, while it is being washed, to forcibly float back into the settling zone the putrescible organic material washed from the grit.

2. The method of treating sewage, industrial waste, or the like, comprising passing sewage containing grit and putrescible organic material through a settling zone at a flow velocity which will favor settling of the grit, collecting the settled grit and moving it in a counter-current direction with respect to the direction of flow of the sewage to a point in the settling zone adjacent the sewage influent, elevating the grit from the settling zone as it reaches said point and simultaneously washing it to separate therefrom putrescible organic material which has been collected with the grit, and forcibly floating back into the settling zone the putrescible organic material which is separated from the grit during the grit-washing operation by passing a concentrated flow of sewage from the sewage influent downwardly over the grit as it is being washed.

3. The method of treating sewage, industrial waste, or the like, comprising passing sewage containing grit and putrescible organic material through a settling zone at a flow velocity which will favor settling of the grit, collecting the settled grit and moving it in a counter-current direction with respect to the direction of flow of the sewage to a point in the settling zone adjacent the sewage influent, elevating the grit from the settling zone as it reaches said point and simultaneously washing it to separate therefrom putrescible organic material which has been collected with the grit, and forcibly floating back into the settling zone the putrescible organic material which is separated from the grit during the grit-washing operation by obstructing the flow of the influent sewage to build up a head and diverting a part of the influent sewage which is subjected to the head downwardly over the grit as it is being washed.

4. The method of treating sewage, industrial waste, or the like, comprising passing sewage containing grit and putrescible organic material through a settling zone at a flow velocity which will favor settling of the grit, collecting the settled grit and moving it toward a point of discharge from the settling zone adjacent the sewage influent for the settling zone, removing the grit from the settling zone as it reaches said point and simultaneously washing it to separate therefrom putrescible organic material which has followed the movement of the grit, and directing a portion of the sewage influent, at a constant high velocity downwardly over the grit being washed to forcibly float back into the settling zone the putrescible organic material separated from the grit.

5. Apparatus for treating sewage, industrial waste, or the like, comprising a chamber through which the raw sewage flows at a rate favoring the settling of grit, an influent for the chamber, means for collecting the settled grit and moving it toward a point of removal from the chamber, means for removing the grit from the chamber and washing it to separate organic solids, and means for diverting a portion of the influent sewage and flowing it at a greater velocity than the aforesaid rate of flow of the raw sewage in a confined path over the grit washing means to float the separated organic solids back into the chamber.

6. Apparatus for treating sewage, industrial waste, or the like, comprising a chamber favoring the settling of grit, an influent channel for the chamber, a grit washing and elevating device including a trough adjacent the influent channel, means for collecting and delivering the settled grit to said device to be moved along said trough, a baffle obstructing the flow of the sewage in the influent channel for building up a fluid head on the upstream side of the baffle, and means above the trough and cooperating with the influent channel for diverting some of the influent sewage forming said head at the upstream side of the baffle and directing it along the trough of the grit washing and elevating device in a direction opposite the direction of movement of the grit by said device for carrying away the material washed from the grit.

7. Apparatus for treating sewage, industrial waste, or the like, comprising a chamber favoring the settling of grit, an influent channel for the chamber, a grit washing and elevating device including a trough adjacent the influent channel, means for collecting and delivering the settled grit to said device to be moved along said trough, a baffle obstructing the flow of the sewage in the influent channel for building up a fluid head on the upstream side of the baffle, a second baffle submerged in the fluid and overlying the washing device and in lateral operative alignment relative to the influent baffle, and means extending from the lower end of the second baffle to overlie and extend lengthwise of the washing device trough for directing a current of influent sewage, which is formed by said head and which passes under said second baffle and its means, downwardly along the grit washing device to float away the material washed from the grit.

8. Apparatus for treating sewage, industrial waste, or the like, comprising a chamber favoring the settling of grit, an influent channel for the chamber, a grit washing and elevating device adjacent the influent channel, means for collecting and delivering the settled grit to said device, a baffle obstructing the flow of the sewage in the influent channel for building up a fluid head on the upstream side of the baffle, means for adjusting the position of the influent baffle in accordance with variations in the liquid level in the channel to maintain a constant fluid head therein, and means for diverting some of the influent sewage affected by said head from the upstream side of the baffle and passing it along the grit washing device in a direction opposite to the direction of movement of the grit by the device for carrying away the material washed from the grit.

9. Apparatus for treating sewage, industrial waste, or the like, comprising a chamber favoring the settling of grit, an influent channel for the chamber, a grit washing and elevating device including a trough adjacent the influent channel, means for collecting and delivering the settled grit to said device to be moved along the trough, a baffle obstructing the flow of the fluid in the influent channel for building up a fluid head on the upstream side of the baffle, a baffle submerged in the fluid and overlying the washing device and in lateral operative aligned relation with the influent baffle, and a plate extending from the lower end of the second to overlie and extend lengthwise of the washing device trough to direct the influent sewage forming said head and passing under said last mentioned baffle along the grit washing device for floating away the material washed from the grit.

10. Apparatus for treating sewage, industrial waste, or the like, comprising a chamber through which the raw sewage flows at a rate favoring the settling of grit, an influent for the chamber, means for collecting the settled grit and moving it toward a point of removal from the the chamber and agitating the grit while being thus moved to separate therefrom the major portion of the organic solids, means for simultaneously washing and de-watering the grit while elevating it for removal from the chamber to separate additional organic solids, a float supported baffle obstructing the flow of sewage in the influent channel for building up a constant fluid head on the upstream side of the baffle, and means positioned above the washing and de-washing means and cooperating with the influent channel for diverting some of the influent sewage affected by said head from the upstream side of the baffle and directing it along the grit washing and de-watering means in a direction opposite to the direction of movement of the grit by said last mentioned means for floating back into the grit chamber the material washed from the grit.

MARCUS B. TARK.